US008644139B2

(12) United States Patent
Armstrong et al.

(10) Patent No.: US 8,644,139 B2
(45) Date of Patent: Feb. 4, 2014

(54) PRIORITY BASED FLOW CONTROL WITHIN A VIRTUAL DISTRIBUTED BRIDGE ENVIRONMENT

(75) Inventors: William J. Armstrong, Rochester, MN (US); Claude Basso, Raleigh, NC (US); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 12/767,543

(22) Filed: Apr. 26, 2010

(65) Prior Publication Data

US 2011/0261687 A1    Oct. 27, 2011

(51) Int. Cl.
*H04L 12/28* (2006.01)
(52) U.S. Cl.
USPC .......................................... 370/229; 370/351
(58) Field of Classification Search
USPC .................................................. 370/229–240
See application file for complete search history.

(56) References Cited

U.S. PATENT DOCUMENTS

| 5,493,566 | A | * | 2/1996 | Ljungberg et al. | 370/231 |
| 5,570,348 | A | * | 10/1996 | Holden | 370/236 |
| 5,629,928 | A | * | 5/1997 | Calvignac et al. | 370/237 |
| 5,689,506 | A | * | 11/1997 | Chiussi et al. | 370/388 |
| 5,787,071 | A | * | 7/1998 | Basso et al. | 370/231 |
| 5,790,522 | A | * | 8/1998 | Fichou et al. | 370/236 |
| 5,901,140 | A | * | 5/1999 | Van As et al. | 370/236 |
| 5,914,936 | A | * | 6/1999 | Hatono et al. | 370/230 |
| 6,011,779 | A | * | 1/2000 | Wills | 370/236 |
| 6,026,075 | A | * | 2/2000 | Linville et al. | 370/236 |
| 6,115,356 | A | * | 9/2000 | Kalkunte et al. | 370/229 |
| 6,122,251 | A | * | 9/2000 | Shinohara | 370/231 |
| 6,151,301 | A | * | 11/2000 | Holden | 370/232 |
| 6,167,029 | A | * | 12/2000 | Ramakrishnan | 370/235 |
| 6,201,792 | B1 | * | 3/2001 | Lahat | 370/236 |
| 6,259,698 | B1 | * | 7/2001 | Shin et al. | 370/395.7 |

(Continued)

FOREIGN PATENT DOCUMENTS

WO    WO 2006 093929 A2    9/2006
WO    WO 2009 085536 A2    7/2009

OTHER PUBLICATIONS

IBM U.S. Appl. No. 12/751,187 entitled "Data Frame Forwarding Using a Multitiered Distributed Virtual Bridge Hierarchy," filed Mar. 31, 2010 by William J. Armstrong et al.

(Continued)

*Primary Examiner* — Michael Thier
*Assistant Examiner* — Prince A Mensah
(74) *Attorney, Agent, or Firm* — Toler Law Group

(57) ABSTRACT

Systems and methods to communicate data frames are provided. A particular apparatus may include a first adapter having a first queue configured to store a data frame associated with a first priority. The adapter is configured to generate a first priority pause frame. A distributed virtual bridge may be coupled to the first adapter. The distributed virtual bridge may include an integrated switch router and a first transport layer module configured to provide a frame-based interface to the integrated switch router. The transport layer module may include a first buffer associated with the first priority. A first bridge element of the distributed virtual bridge may be coupled to the first adapter queue and to the first transport layer module. The first bridge element is configured to receive the first priority pause frame from the adapter and to communicate an interrupt signal to the first transport layer module to interrupt delivery of the data frame to the first queue.

19 Claims, 5 Drawing Sheets

(56) References Cited

U.S. PATENT DOCUMENTS

| | | | |
|---|---|---|---|
| 6,388,993 B1 * | 5/2002 | Shin et al. | 370/233 |
| 6,405,258 B1 * | 6/2002 | Erimli et al. | 709/235 |
| 6,594,234 B1 * | 7/2003 | Chard et al. | 370/236 |
| 6,622,193 B1 * | 9/2003 | Avery | 710/263 |
| 6,628,613 B1 * | 9/2003 | Joung et al. | 370/230 |
| 6,661,788 B2 * | 12/2003 | Angle et al. | 370/390 |
| 6,802,068 B1 | 10/2004 | Guruprasad | |
| 6,807,172 B1 | 10/2004 | Levenson et al. | |
| 6,859,435 B1 * | 2/2005 | Lee et al. | 370/231 |
| 6,920,147 B2 * | 7/2005 | Wallner et al. | 370/416 |
| 6,973,032 B1 * | 12/2005 | Casley et al. | 370/230 |
| 6,980,547 B1 | 12/2005 | Gally et al. | |
| 7,023,857 B1 * | 4/2006 | Chiussi et al. | 370/395.4 |
| 7,061,868 B1 * | 6/2006 | Ahlfors et al. | 370/236 |
| 7,138,733 B2 | 11/2006 | Sanders et al. | |
| 7,688,728 B2 * | 3/2010 | Ardhanari et al. | 370/230.1 |
| 7,751,416 B2 | 7/2010 | Smith et al. | |
| 7,756,027 B1 | 7/2010 | Reddy et al. | |
| 7,876,746 B1 | 1/2011 | Pannell et al. | |
| 7,889,728 B2 | 2/2011 | Arad et al. | |
| 7,992,149 B2 | 8/2011 | Carollo et al. | |
| 8,194,534 B2 | 6/2012 | Pandey et al. | |
| 2003/0037163 A1 | 2/2003 | Kitada et al. | |
| 2003/0236852 A1 * | 12/2003 | Fernandes et al. | 709/215 |
| 2004/0037279 A1 | 2/2004 | Zelig et al. | |
| 2004/0179476 A1 * | 9/2004 | Kim et al. | 370/230 |
| 2005/0174941 A1 * | 8/2005 | Shanley et al. | 370/235 |
| 2006/0023708 A1 | 2/2006 | Snively et al. | |
| 2006/0149864 A1 * | 7/2006 | Chen | 710/52 |
| 2006/0149886 A1 | 7/2006 | Chen et al. | |
| 2006/0248158 A1 | 11/2006 | Ha et al. | |
| 2007/0067432 A1 | 3/2007 | Tarui et al. | |
| 2007/0147368 A1 | 6/2007 | Desai et al. | |
| 2007/0260910 A1 | 11/2007 | Jain et al. | |
| 2007/0268830 A1 * | 11/2007 | Li et al. | 370/235 |
| 2007/0299987 A1 | 12/2007 | Parker et al. | |
| 2008/0002579 A1 | 1/2008 | Lindholm et al. | |
| 2008/0056300 A1 | 3/2008 | Williams | |
| 2008/0159260 A1 | 7/2008 | Vobbilisetty et al. | |
| 2008/0159277 A1 | 7/2008 | Vobbilisetty et al. | |
| 2008/0275975 A1 | 11/2008 | Pandey et al. | |
| 2009/0147685 A1 * | 6/2009 | Malhotra | 370/236 |
| 2009/0161692 A1 | 6/2009 | Hirata et al. | |
| 2009/0213869 A1 | 8/2009 | Rajendran et al. | |
| 2009/0252181 A1 | 10/2009 | Desanti | |
| 2009/0254677 A1 | 10/2009 | Desanti | |
| 2009/0265501 A1 | 10/2009 | Uehara et al. | |
| 2009/0276526 A1 | 11/2009 | Carlson et al. | |
| 2009/0303876 A1 * | 12/2009 | Wu | 370/230.1 |
| 2010/0067374 A1 | 3/2010 | Elangovan et al. | |
| 2010/0085966 A1 | 4/2010 | Samuels et al. | |
| 2010/0128605 A1 | 5/2010 | Chavan et al. | |
| 2010/0150174 A1 | 6/2010 | Bhide et al. | |
| 2010/0257269 A1 | 10/2010 | Clark | |
| 2011/0061094 A1 | 3/2011 | Salkewicz | |
| 2011/0069710 A1 | 3/2011 | Naven et al. | |
| 2011/0085557 A1 | 4/2011 | Gnanasekaran et al. | |
| 2011/0153715 A1 | 6/2011 | Oshins et al. | |
| 2011/0243134 A1 | 10/2011 | Armstrong et al. | |
| 2011/0243146 A1 | 10/2011 | Armstrong et al. | |
| 2011/0258340 A1 | 10/2011 | Armstrong et al. | |
| 2011/0258641 A1 | 10/2011 | Armstrong et al. | |
| 2011/0261687 A1 | 10/2011 | Armstrong et al. | |
| 2011/0261815 A1 | 10/2011 | Armstrong et al. | |
| 2011/0261826 A1 | 10/2011 | Armstrong et al. | |
| 2011/0261827 A1 | 10/2011 | Armstrong et al. | |
| 2011/0262134 A1 | 10/2011 | Armstrong et al. | |
| 2011/0320671 A1 | 12/2011 | Armstrong et al. | |

OTHER PUBLICATIONS

IBM U.S. Appl. No. 12/751,249 entitled "Data Frame Forwarding Using a Distributed Virtual Bridge," filed Mar. 31, 2010 by William J. Armstrong et al.

IBM U.S. Appl. No. 12/763,306 entitled "Distributed Virtual Bridge Management," filed Apr. 20, 2010 by William J. Armstrong et al.

IBM U.S. Appl. No. 12/763,323 entitled "Remote Adapter Configuration," filed Apr. 20, 2010 by William J. Armstrong et al.

IBM Patent Application entitled "Distributed Link Aggregation," filed Apr. 26, 2010 by William J. Armstrong et al.

IBM Patent Application entitled "Multicasting Using a Multitiered Distributed Virtual Bridge Hierarchy," filed Apr. 26, 2010 by William J. Armstrong et al.

IBM Patent Application entitled "Address Data Learning and Registration Within a Distributed Virtual Bridge," filed Apr. 26, 2010 by William J. Armstrong et al.

Hufferd, John L., "Proxy Based Shortcut, Hufferd Enterprises", Oct. 7, 2009, (21 pgs).

Cisco Systems, "The Adaptive Architecture for the Data Center Network", 2007, (3 pgs).

Cisco Systems, "Integrating the Cisco Catalyst Blade Switch 3130 for Dell PowerEdge M1000e Blade Enclosure into the Cisco Data Center Network Architecture—Design Guide," Oct. 2007, retrieved from the Internet: http://cisco.com/en/US/prod/collateral/switches/ps6746/ps8742/ps8764/white_paper_c07-443792.pdf [retrieved on Sep. 21, 2011], (29 pgs).

U.S. Appl. No. 12/751,249, Non-Final Office Action dated Oct. 12, 2012, (19 pgs).

U.S. Appl. No. 12/839,099, Final Office Action dated Oct. 25, 2012, (8 pgs).

* cited by examiner

"Prior Art"

PRIORITY BASED FLOW CONTROL WITHIN A VIRTUAL DISTRIBUTED BRIDGE ENVIRONMENT

I. FIELD OF THE DISCLOSURE

The present disclosure relates generally to data communications, and more specifically, to forwarding data frames within a highly integrated environment.

II. BACKGROUND

Server computers may be continuously managed to enable access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

To illustrate, FIG. 1 shows a conventional blade server computer system 100. The system 100 includes a plurality of server computers 106-125 housed within racks 102, 104 and arranged into chassis 138, 140, 142, and 144. An illustrative server computer 106 may include a half-width information technology element (ITE) blade server computer.

Data frame communications between the server computers 106-125 housed within different chassis 138, 140, 142, 144 or racks 102, 104 may be referred to as east-west connectivity. For example, the server computer 111 of a first chassis 140 may forward a data frame to the server computer 106 of another chassis 138 via a path 164. The path 164 includes a chassis switch 154 and a top of rack switch (TOR) 158. The chassis switch 154 and the top of rack switch 158 may route the data frame based upon a media access control (MAC) address.

When the server computer 111 of the rack 102 forwards a data frame to the server computer 123 of the rack 104, the data frame travels through paths 166 and 168. The paths 166 and 168 include the top of rack switch 158 associated with the rack 102, an end of rack switch (EOR) 162, and a top of rack switch 160 associated with the rack 104, as well as the chassis switches 154 and 156. The top of rack switch 158 is again used when the server computer 111 attempts north-south connectivity (i.e., internal to external data frame communication) through paths 166 and 170. Because the data frames in the above examples are all routed through the top of rack switches 158, 160, a potential bottleneck scenario can result.

III. SUMMARY OF THE DISCLOSURE

In a particular embodiment, an apparatus is disclosed that includes a first adapter including a first queue configured to store a data frame associated with a first priority. The first adapter may be configured to generate a first priority pause frame. A distributed virtual bridge may be coupled to the first adapter. The distributed virtual bridge may include an integrated switch router and a first transport layer module configured to provide a frame-based interface to the integrated switch router. The transport layer module may include a first buffer associated with the first priority. A first bridge element of the distributed virtual bridge may be coupled to the first adapter and to the first transport layer module. The first bridge element may be configured to receive the first priority pause frame from the first adapter and to communicate an interrupt signal to the first transport layer module to interrupt delivery of the data frame to the first queue.

In another embodiment, a method that includes managing data frame traffic flow is disclosed. The method includes receiving at a bridge element a first priority pause frame, wherein the first priority pause frame is generated in response to a status of a first queue configured to store a first data frame associated with a first priority. A first interrupt signal may be communicated to a first transport layer module to interrupt delivery to the first queue of the first data frame. The first transport layer module may be coupled to the bridge element and include a first buffer associated with the first priority.

In another embodiment, a program product includes program code executable at a bridge element of a distributed virtual bridge to receive a priority pause frame associated with a status of an adapter queue. The adapter queue may be configured to store a first data frame associated with a first priority. The program code may be further executed to generate and communicate an interrupt signal to a transport layer module coupled to the bridge element. The interrupt signal may be configured to interrupt delivery to the adapter queue of the data frame. The transport layer module may include a buffer associated with the first priority. A computer readable storage medium may bear the program code.

An embodiment may facilitate lossless, point-to-point, in-order data frame delivery of data frames. Data frame traffic management functions may be distributed to decrease redundancy and increase efficiency. Cost and space demands may be reduced, and an embodiment of a system may be scalable to include hundreds or more server computers with direct connectivity. Embodiments may result in improved bandwidth utilization, as well as improved management efficiencies.

Features that characterize embodiments are set forth in the claims annexed hereto and forming a further part hereof. However, for a better understanding of embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

An embodiment may control traffic flow within a distributed virtual bridge by distributing priority pause control processes. Priority based flow control may be used to allow a receiver to halt or otherwise interrupt link traffic injection associated with a particular priority. The bridge element of a distributed virtual bridge may send a priority pause frame to a sender to temporarily halt transmission. Data frame transmission may be paused based on the priority of the data frames and a predetermined threshold capacity of network devices. Back-pressure may be applied to a specific priority to a source in order to relieve congestion. Aspects may improve flow control while maintaining frame integrity and data prioritization.

Figure 2:
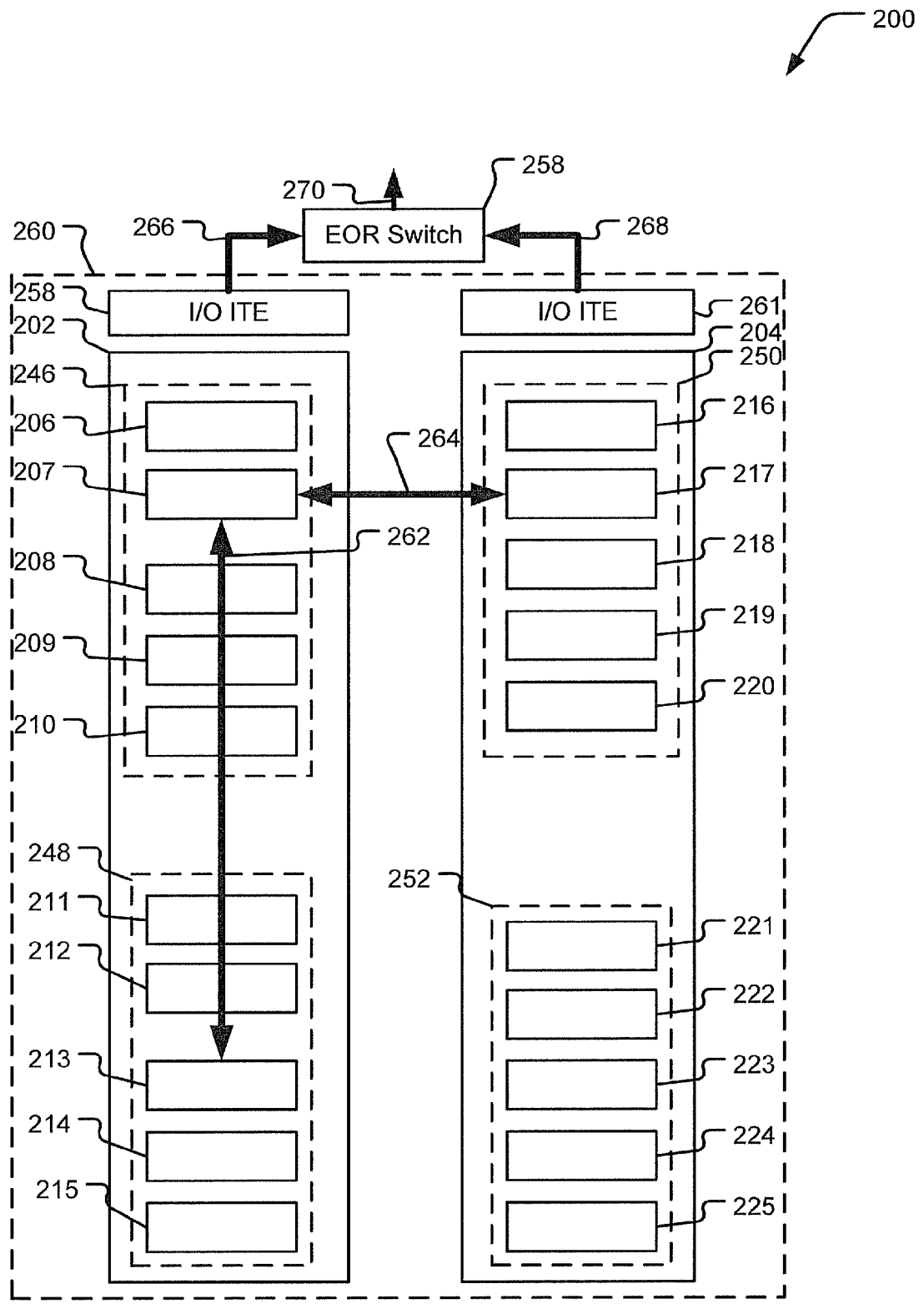
FIG. 2 is a block diagram of an embodiment of a highly integrated computing system configured to allow direct communication between server computers housed within different racks and chassis of blade server computers.

Turning particularly to the drawings, FIG. 2 shows an illustrative embodiment of a highly integrated system 200 configured to forward data frames using a distributed virtual bridge 260. The distributed virtual bridge 260 may extend across server computers 206-225, chassis 246, 248, 250, 252, and racks 202, 204 to provide data link layer (e.g., Layer 2) switching between bridge elements. The bridge elements may provide a frame-based, Ethernet-like interface. The interface may facilitate lossless, point-to-point, in-order frame delivery between server computers 206-225 of different racks 202, 204 or chassis 246, 248, 250, 252 (i.e., east-west connectivity) with reduced redundancy and latency.

The system 200 further includes an end-of-rack switch (EOR) 270 and input/output (I/O) server ITEs 258, 261 that enable north-south connectivity. The I/O server ITEs 258, 261 may enable uplink connectivity to an external Ethernet network (or other network) for the server computers 206-225 housed within the racks 202, 204.

Figure 1:
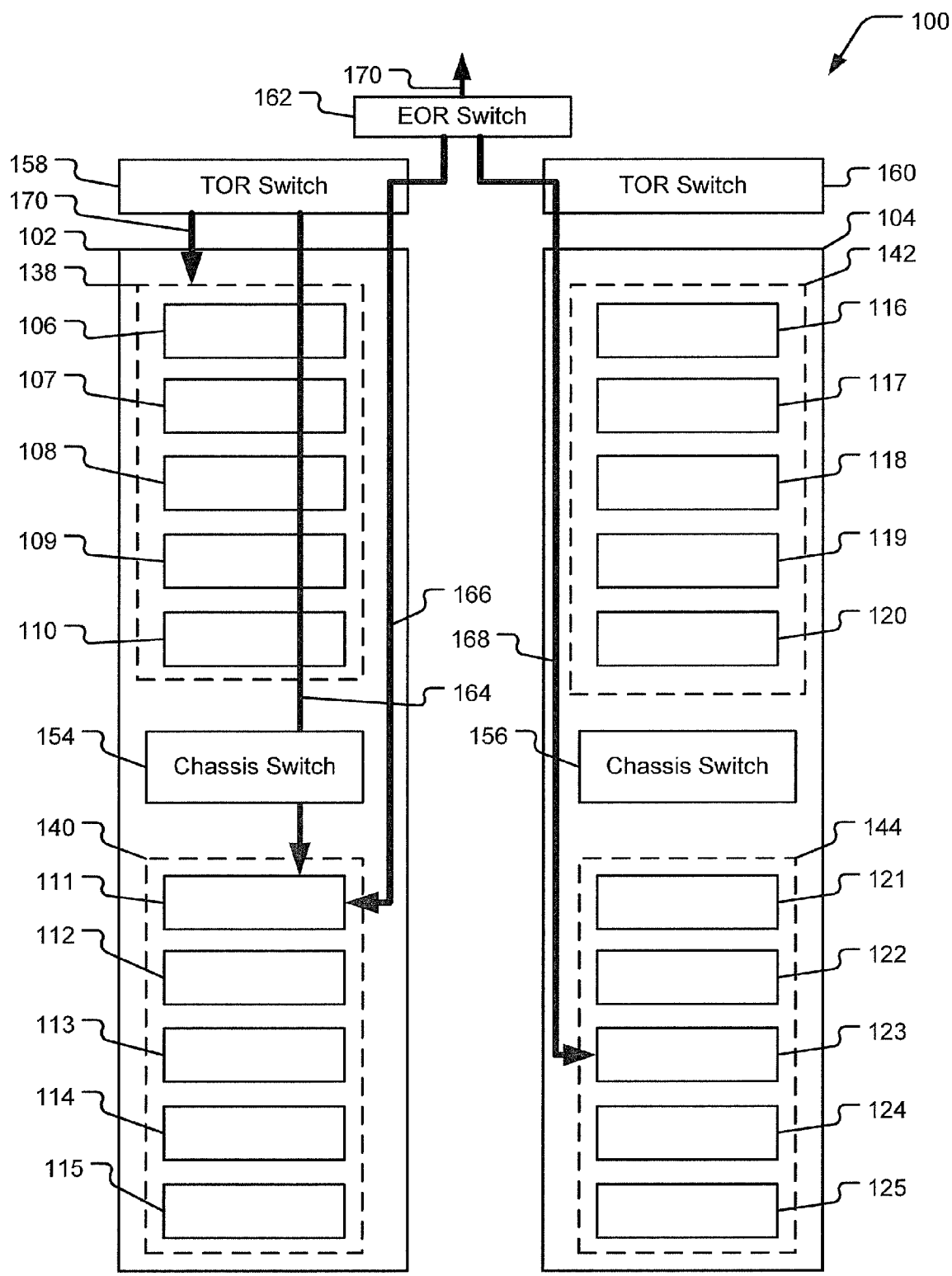
FIG. 1 is a block diagram of a prior art computing system that includes racks of blade server computers.

An arrow 264 of FIG. 2 represents direct east-west connectivity and the flow of data frames between server computers located in different racks 202, 204 of the system 200 (e.g., without using a top of rack or chassis switch, such as switches 158, 160 of FIG. 1). An arrow 262 represents direct east-west connectivity across different chassis 246, 248 of the rack 202.

The system 200 of FIG. 2 may enable direct connectivity between server computers of different racks or chassis. To accommodate the relatively high level of system integration, distributed bridge elements may be programmed to independently route data frames. The distribution of routing processes may streamline the routing of data frames and facilitate scalability. The bridge elements and distributed routing within the distributed virtual bridge 260 may reduce contention for resources and increase data frame traffic flow.

Figure 3:
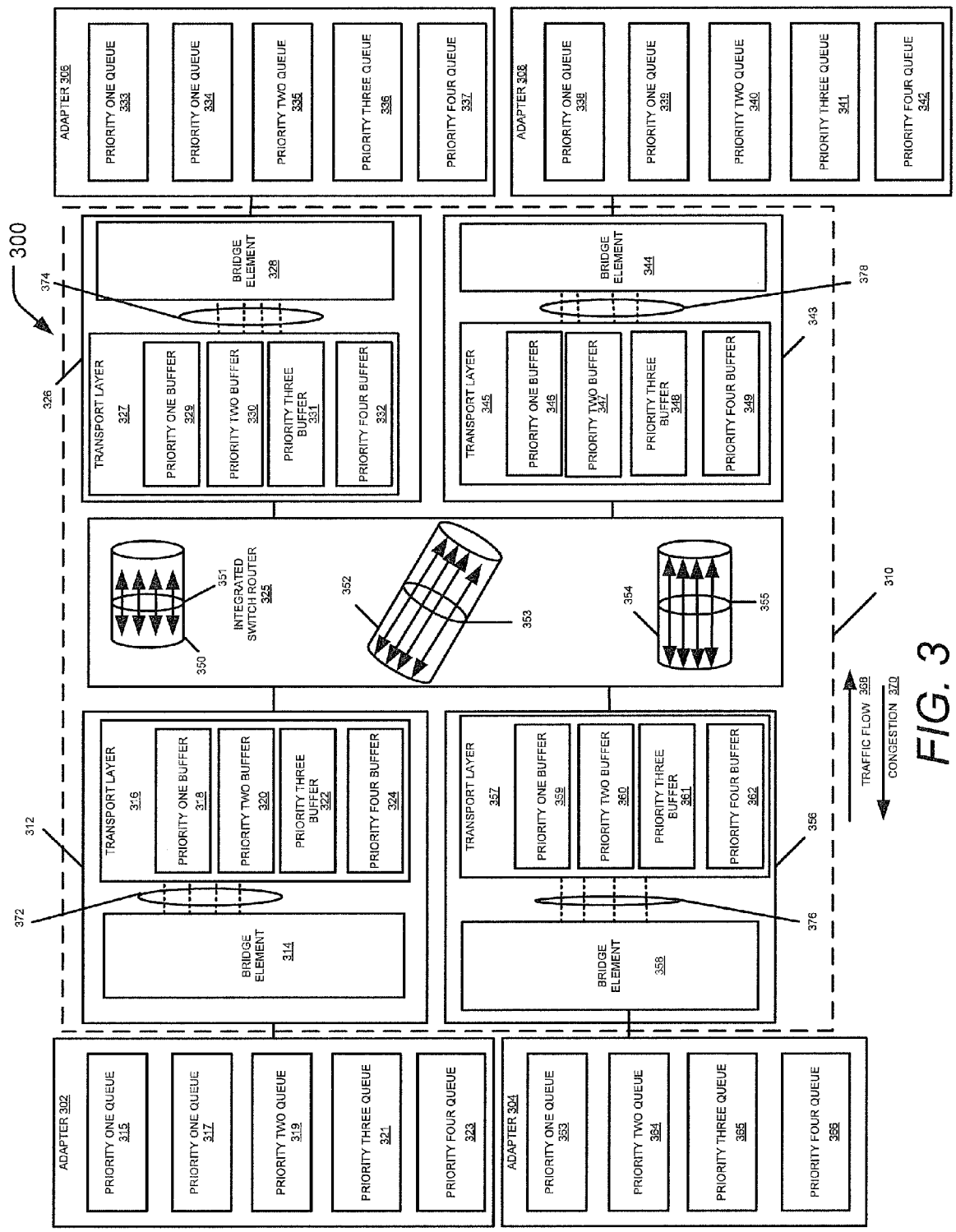
FIG. 3 is a block diagram of a particular embodiment of a system configured to manage data frame traffic flow using a distributed virtual bridge.

FIG. 3 shows an embodiment of a system 300 configured to manage prioritized data frames using a distributed virtual bridge 310. The distributed virtual bridge 310 may be similar to the distributed virtual bridge 260 of FIG. 2. The system 300 may be configured to interrupt the transmission of a data frame addressed to a network component based upon a priority of the data frame and a storage threshold capacity of the network component.

The system 300 may include an adapter 302 that is coupled to the distributed virtual bridge 310. The adapter 302 may include a queue 315 comprising one or more buffers that store data frames associated with a first priority. A queue 317 of the adapter 302 may also store data frames associated with the first priority. A queue 319 may be configured to store data frames associated with a second priority, and a queue 321 may store data frames of a third priority. The adapter 302 may further include a queue 323 configured to transmit data frames associated with a fourth priority.

Illustrative priorities may include lossless remote direct memory access (RDMA) and lossless Fiber Channel over Ethernet (FCoE). Another priority may include a lossy transmission control protocol (TCP) and a priority based flow control (PFC), as well as lossy PG15 protocol. A bridge element, such as the bridge element 314 of the distributed virtual bridge 310, may be configured to map such priorities between priority levels of the Institution of Electrical Engineers (IEE) 802.1Q standard.

The adapter 302 may be coupled directly to the bridge element 314. The bridge element 314 may include a bufferless entity configured to perform Layer-2 data forwarding. The bridge element 314 may comprise a part of a node 312, along with a transport layer module 316. The transport layer module 316 may include a buffer 318 associated with data frames of the first priority. A buffer 320 may be associated with data frames of the second priority, and a third buffer 322 may be associated with data frames of the third priority. A buffer 324 may be associated with data frames of the fourth priority.

In operation, the adapter 302 may send data frames from the queues 315, 317, 319, 321, and 323. The data frames may be received at the bridge element 314 and transmitted via virtual lanes 372 to the buffers 318, 320, 322, and 324 of the transport layer module 316. The virtual lanes 372 and buffers 318, 320, 322, 324 may segregate the data frames according to the respective priority associated with the data frames. For example, data frames sent from the queue 315 (associated with the first priority) may be received in the buffer 318 (also associated with the first priority). Data frames associated with the second priority may be sent from the queue 319 and received in the buffer 320. In this manner, the virtual lanes 372 may keep the prioritized data frames separate from one another.

The transport layer module 316 may be categorized as a transport layer module "out" by virtue of the illustrative traffic flow being in the direction indicated by the arrow 368. That is, data frames may be forwarded out of the transport layer module 316 to an integrated switch router 325.

The transport layer module 316 may be coupled to the integrated switch router 325. The integrated switch router 325 may be configured to facilitate lossless, point-to-point, in-order data frame transmission. The integrated switch router 325 may include pipelines 350, 352, 354 representing logical traffic paths through the integrated switch router 325. Prioritized traffic may be segregated within the pipelines 350, 352, and 354. For example, the pipeline 350 includes separate paths 351 corresponding to separated data frame flows associated with different priorities. The pipeline 352 includes segregated paths 353, and the pipeline 354 includes segregated paths 355. The transport layer module 316 may include virtual output queues for each priority within each of the paths 355.

Similar to the adapter 302, the adapter 304 may include a queue 363 configured to store data frames associated with the first priority. A queue 364 may be configured to store data frames associated with the second priority, and a queue 365 may be configured to store data frames associated with a third priority. The adapter 304 may further include a queue 366 configured to store data frames associated with the fourth priority.

The adapter 304 may be coupled to a node 356. The node 356 may include a transport layer module 357 that includes a buffer 359 storing data frames associated with the first priority. A buffer 360 may store data frames associated with a second priority, and a buffer 361 may store data frames associated with a third priority. A buffer 362 may store data frames associated with a fourth priority.

The transport layer module 357 may be coupled to a bridge element 358 of the node 356 via virtual lanes 376. The transport layer module 357 may additionally be coupled to the integrated switch router 325.

On the receiving side (e.g., right of the integrated switch router 325) of FIG. 3, a transport layer module 327 of a node 326 may be coupled to the integrated switch router 325. The transport layer module 327 may include a buffer 329 configured to store data frames associated with the first priority. A buffer 330 may be configured to store data frames associated with the second priority, and a buffer 331 may be configured to store data frames associated with the third priority. A buffer 332 may store data frames associated with the fourth priority.

The transport layer module 327 may be categorized as a transport layer module "in" because it is positioned downstream from the integrated switch router 325 per the traffic flow line 368. That is, the transport layer module 327 may receive data frames from the integrated switch router 325 during a data frame transaction. Data frames may be forwarded from the buffers 329-332 of the transport layer module 327 to a bridge element 328 via the virtual lanes 374.

The node 326 may be coupled to an adapter 306. The adapter 306 may include a queue 333 of buffers configured to receive and store data frames associated with the first priority. A queue 334 may additionally be configured to receive and store data frames associated with the first priority. Queues 335, 336, and 337 may be configured to receive and store data frames associated with the first, second, third, and fourth priorities, respectively.

A node 343 comprising a bridge element 344 and a transport layer module 345 may be coupled to the integrated switch router 325. The transport layer module 345 may include buffers 346, 347, 348, 349, configured to store data frames associated with the first, second, third, and fourth priorities, respectively. The transport layer module 345 may be coupled to the bridge element 344 via virtual lanes 378. The virtual lanes 378 may maintain data frame segregation based on the respective priorities of the data frames.

An adapter 308 may be coupled to the bridge element 344. The adapter 308 may include queues 338 and 339 associated with the first priority. A queue 340 may be configured to receive and store data frames associated with the second priority. Queues 341 and 342 may be configured to receive data and store frames associated with the third and fourth priorities, respectively.

In operation, the buffers of the queue 334 of the adapter 306 may become depleted. The queues 333 and 334 may be associated with the first priority. While the adapter 306 may continue to receive data frames associated with other priorities, and while the queue 333 may initially receive data frames, no more storage space may be available for data frames in the queue 334.

The adapter 306 may generate and send a priority pause frame to the bridge element 328. The priority pause frame may be configured to halt the forwarding of data frames associated with the first priority.

The bridge element 328 may communicate an interrupt signal to the transport layer module 327 to halt the delivery of data frames associated with the first priority to the adapter 306. Although the buffer 329 of the transport layer module 327 may cease to have data frames sent out, the buffer 329 may continue to receive data frames associated with the first priority. The buffer 329 may consequently become full. The full or nearly full status of the buffer 329 may be communicated to a transport layer module (e.g., the transport layer module 316) that attempts to send additional data frames associated with the first priority. For example, the transport layer 327 may cease to send credits to the transport layer 316 when the buffer 329 reaches a threshold capacity. Credits, or control flow units, may be exchanged to determine how much data may be received by the transport layer modules 316, 327 on opposite sides of the integrated switch router 325.

The transport layer module 316 may prevent the buffer 318 from sending out data frames associated with the first priority. Should the buffer 318 continue to receive data frames, the buffer 318 will become full. The status of the buffer 318 may be communicated to the bridge element 314. The bridge element 314 may generate and send a priority pause frame to the adapter 302. The queues 315, 317 having data frames associated with the first priority may subsequently cease sending data frames associated with the first priority. In this manner, the backup indicated by the congestion arrow 370 may halt transmission of data frames associated with the first priority in response to a storage or processing threshold capacity having been reached. For example, both queues 315 and 317 of the adapter 302 could be used to deliver data frames to the queues 333 and 334 of the adapter 306 in absence of congestion. However, the backup caused by congestion may eventually prevent the adapter 302 from sending data frames associated with the first priority to the adapter 306, as well as to the adapter 308.

FIG. 3 thus shows a system 300 that uses a distributed virtual bridge 310 to manage the flow of data frame traffic. Data frame transmission may be paused based on the priority of the data frames and a threshold capacity of network devices. Aspects may improve flow control while maintaining frame integrity and data prioritization.

Figure 4:
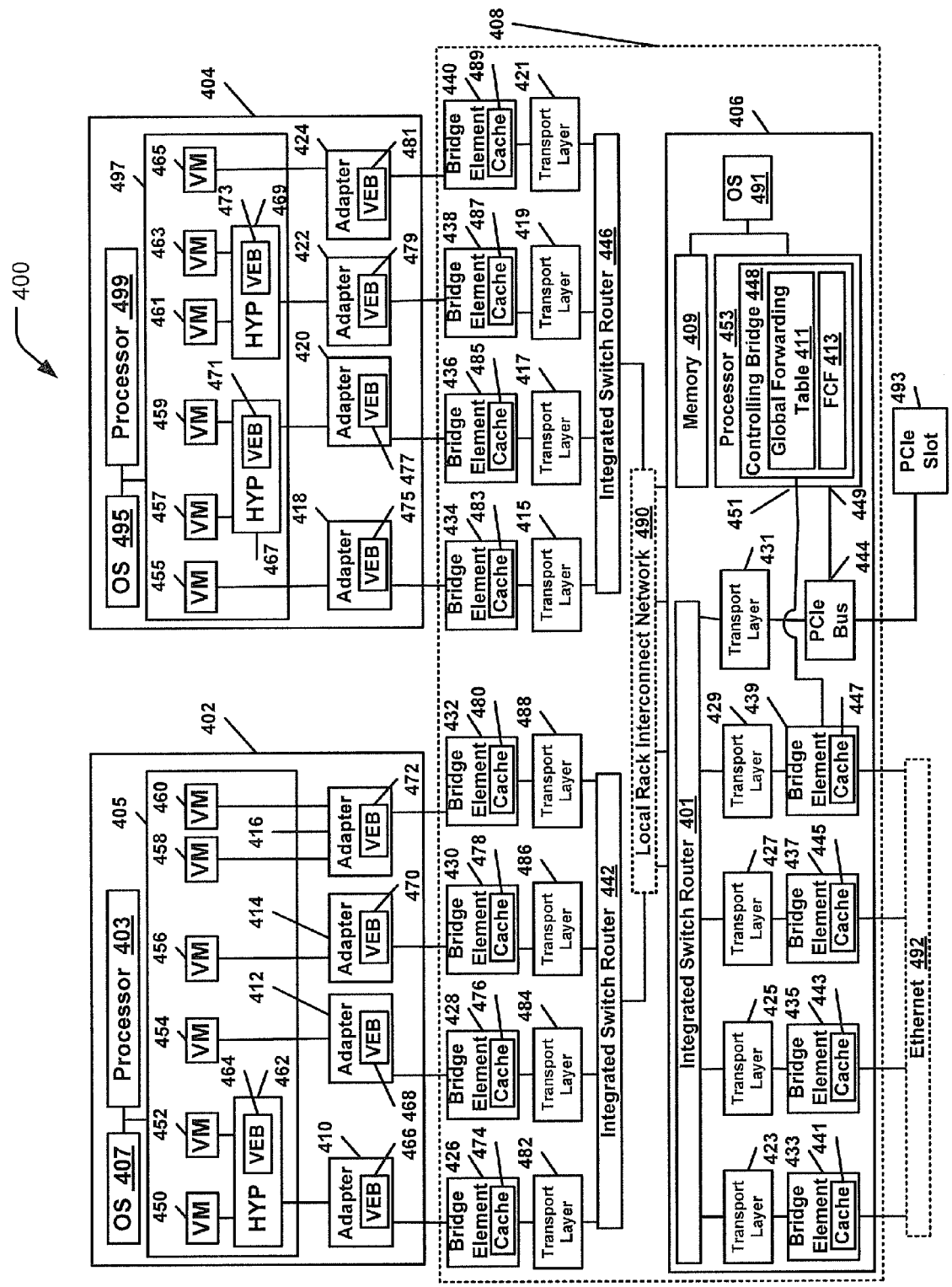
FIG. 4 is a block diagram of a particular embodiment of a system including a distributed virtual bridge configured to route data frame traffic.

Referring to FIG. 4, a particular illustrative embodiment of a highly integrated system 400 configured to route data frames using distributed bridge elements is depicted. FIG. 4 generally shows a computer system 400 configured to forward data frames using a distributed virtual bridge 408. The distributed virtual bridge 408 may selectively forward management frames to distributed switches (e.g., bridge elements and adapters).

The distributed virtual bridge 408 may be similar to the distributed virtual bridge 260 of FIG. 2. The system 400 includes a first server computer 402 and a second server computer 404 that are both coupled to an I/O blade device 406 via the distributed virtual bridge 408. The server computers 402, 404 and the I/O blade device 406 may be housed within separate chassis and racks. For example, the server computers 402, 404 and the I/O blade device 406 may correspond respectively to the server computers 210, 220 and the I/O ITE 261 of FIG. 2

The distributed virtual bridge 408 may be coupled to multiple adapters 410, 412, 414, 416, 418, 420, 422, and 424. The adapters 410, 412, 414, 416, 418, 420, 422, and 424 may be located within or may be coupled to the server computers 402, 404. The distributed virtual bridge 408 may use multiple access points, or bridge elements 426, 428, 430, and 432-440 to couple to the server computers 402, 404. For example, a microchip that includes the bridge elements 426, 428, 430, and 432 may be cabled or otherwise coupled to a port of the server computer 402 that includes the adapter 410. As explained herein, the distributed virtual bridge 408 may functionally supplant chassis switches and top of rack switches with a frame-based network fabric that functions in a similar fashion to an Ethernet network.

One or more transport layer modules 482, 484, 486, and 488 coupled to the bridge elements 426, 428, 430, and 432 may provide a frame-based, Ethernet-like interface to one or more integrated switch routers 442. The transport layer module 482 may be configured to deconstruct a transmission of data frames so that packet information may be evenly distributed across links to a local rack interconnect 490. The data frames may not be serialized upon leaving the transport layer module 482. A receiving transport layer module 423 may serialize the data frames to achieve reliable, in-order delivery. If the receiving transport layer module 423 determines that data frame information is missing, the transport layer module 423 may initiate a process to recover the missing data. The translation process may be accomplished in hardware, which may provide a larger bandwidth and faster processing than software applications. The transport layer modules 482, 484, 486, and 488, the integrated switch router 442, and the local rack interconnect network 490 may combine to include an underlying lossless, point-to-point communication network (i.e., an integrated switch router network) between the server computers 402, 404 and the I/O blade device 406.

The bridge elements 426, 428, 430, and 432 may function as data link layer (i.e., Layer 2) bridge forwarders within the distributed virtual bridge 408. In particular embodiments, the bridge elements 426, 428, 430, and 432 may comprise a switch, or router device. The bridge elements 426, 428, 430, and 432 may include learned (e.g., received and stored) cached address data used to forward data frames throughout the distributed virtual bridge 408. The learned address data may correspond to one or both of a destination address and a source address associated with a data frame.

When the bridge element 426 does not include address data pertinent to a source or destination address of a received data frame, the bridge element 426 may query a controlling bridge 448 for the address data. The controlling bridge 448 may include a global forwarding table 411 that includes stored address data. The stored address data may be continuously updated by the bridge elements 426, 428, 430, and 432. For example, a bridge element 426 may send an update message to the controlling bridge 448 in response to learning an updated or new MAC address. A corresponding MAC address in the global forwarding table 411 may be subsequently updated.

Conversely, the address data of the global forwarding table 411 may be used to update the bridge elements 426, 428, 430, and 432. For example, the controlling bridge 448 may respond to a query from the bridge element 426 with requested address data. The bridge element 426 may cache the received address data for future use (e.g., at the forwarding cache 474).

The first server computer 402 may comprise a blade server computer, such as the server computer 206 shown in FIG. 2. The first server computer 402 may include one or more virtual machines (VMs) 450, 452, 454, 456, 458, and 460. A virtual machine may include a software implementation of a computer and may execute programs in a manner similar to a physical machine.

FIG. 4 shows an illustrative hypervisor 462 that is coupled to both the virtual machine 450 and the virtual machine 452. The hypervisor 462 may include platform virtualization software that allows multiple operating systems to run concurrently on the first server computer 402. The hypervisor 462 may include a hypervisor virtual bridge 464 that allows direct communication between the virtual machines 450, 452 without traversal of an external network. In one embodiment, the hypervisor virtual bridge 464 may register address information with the controlling bridge 448.

The first server computer 402 may include at least one processor 403 coupled to a memory 405. The processor 403 may represent one or more processors (e.g., microprocessors), and the memory 405 may represent random access memory (RAM) devices comprising the main storage of the server computer 402, as well as supplemental levels of memory, e.g., cache memories, non-volatile or backup memories (e.g., programmable or flash memories), read-only memories, etc. In addition, the memory 405 may be considered to include memory storage physically located in the first server computer 402 or on another server computer coupled to the server computer 402 via the distributed virtual bridge 408 (e.g., the second server computer 404).

The first server computer 402 may operate under the control of an operating system (OS) 407 and may execute or otherwise rely upon various computer software applications, components, programs, objects, modules, and data structures, such as the virtual machines 450, 452, 454, 456, 458, and 460. Moreover, various applications, components, programs, objects, modules, etc. may also execute on one or more processors in another device coupled to the server computer 402 (e.g., in a distributed computing environment, where computing processes may be allocated to multiple server computers).

The first server computer 402 may include adapters 410, 412, 414, and 416, such as converged network adapters. A converged network adapter may include a single root I/O virtualization (SR-IOV) adapter, such as a Peripheral Component Interconnect Express (PCIe) adapter that supports Converged Enhanced Ethernet (CEE). Another embodiment of the system 400 may include a multi-root I/O virtualization (MR-IOV) adapter. The adapters 410, 412, 414, and 416 may be used to implement a Fiber Channel over Ethernet (FCoE) protocol. Each adapter 410, 412, 414, and 416 may be coupled to one or more of the virtual machines 450, 452, 454, 456, 458, and 460. The adapters 410, 412, 414, and 416 may facilitate shared access of the virtual machines 450, 452, 454, 456, 458, and 460. While the adapters 410, 412, 414, and 416 are shown in FIG. 4 as being included within the first server computer 402, adapters of another embodiment may include physically distinct devices that are separate from the server computers 402, 404.

Each adapter 410, 412, 414, and 416 may include a converged adapter virtual bridge 466, 468, 470, and 472. The converged adapter virtual bridges 466, 468, 470, and 472 may facilitate sharing of the adapters 410, 412, 414, and 416 by coordinating access by the virtual machines 450, 452, 454, 456, 458, and 460. Each converged adapter virtual bridge 466, 468, 470, and 472 may recognize data flows included within its domain, or addressable space. A recognized domain address may be routed directly, without processing or storage, outside of the domain of the particular converged adapter virtual bridge 466, 468, 470, and 472. Each adapter 410, 412, 414, and 416 may include one or more CEE transmit ports that couple to one of the bridge elements 426, 428, 430, and 432. In another embodiment, bridge elements may be co-located with the adapters, and coupling between adapters and the bridge elements may not be Ethernet connections.

The bridge elements 426, 428, 430, and 432 may be configured to forward data frames throughout the distributed virtual bridge 408. The bridge elements 426, 428, 430, and 432 may thus function as access points for the distributed virtual bridge 408 by translating between Ethernet and the integrated switch router 442. The bridge elements 426, 428, 430, and 432 may not include buffers and may support CEE at boundaries of the distributed virtual bridge 408. In another embodiment, the bridge elements 426, 428, 430, and 432 may include buffers.

Each bridge element 426, 428, 430, and 432 of the distributed virtual bridge 408 may include a forwarding cache 474, 476, 478, and 480. A forwarding cache 474, 476, 478, and 480 may include a lookup table that stores address data used to forward data frames that are received by the bridge elements 426, 428, 430, and 432. For example, the bridge element 426 may compare address data associated with a received data frame to the address data stored within the forwarding cache 474.

Illustrative address data may include routing information, such as a routing key included within header data of the data frame. The routing key may include at least one of a virtual local area network (VLAN) tag and a logical network identifier, as well as a MAC address. The MAC address may be generated and assigned by a Fiber Channel Forwarder (FCF) 413, as set by an administrator or computing system. The Fiber Channel Forwarder 413, or FCoE switch, may facilitate connectivity between FCoE initiators and Fiber Channel fabrics. To illustrate, an FCoE data frame sent from the first virtual machine 458 and intended for a second virtual machine 463 at the second server 404 may be addressed to the Fiber Channel Forwarder 413 in accordance with the FCoE standard. According to standard routing procedures, the Fiber Channel Forwarder 413 may receive and re-address the FCoE data frame for forwarding to the virtual machine 463.

The MAC address of the Fiber Channel Forwarder 413 may have been learned by the first server computer 402 during a discovery phase, when the Fiber Channel Forwarder 413 establishes communications with networked devices. During the discovery phase, the second server computer 404 may respond to broadcast queries from the first server computer 402. The Fiber Channel Forwarder 413 may discover the second server computer 404 from the query responses. After the discovery phase, a login phase may be initiated. A MAC address of the server computer 404 may be reassigned by the Fiber Channel Forwarder 413. The reassigned MAC address may be used for subsequent routing and communications between the server computers 402, 404. The Fiber Channel Forwarder 413 may facilitate storage of MAC addresses assigned to the server computers 402, 404.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 408. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 474, 476, 478, and 480 of the distributed virtual bridge 408 may have a format similar to the global forwarding table 411 of the controlling bridge 448. The forwarding caches 474, 476, 478, and 480 may have smaller memory capacities than the global forwarding table 411. The forwarding caches 474, 476, 478, and 480 may further be updated with address data learned from data frames that flow through the bridge elements 426, 428, 430, and 432.

The address data may additionally be updated with address data received from the global forwarding table 411. Invalid or changed address data that is updated within one or more of the forwarding caches 474, 476, 478, and 480 of the bridge elements 426, 428, 430, and 432 may be communicated to the global forwarding table 411 of the controlling bridge 448. For example, the bridge element 426 may learn a new MAC address of a newly added device that is configured to receive from or send data to the distributed virtual bridge 408.

The bridge element 426 may verify that a source MAC address included within a received data frame is allowed at a port by checking a list stored within a memory. The bridge element 426 may send a registration message to the controlling bridge 448 to update the global forwarding table 411 with the verified MAC address. The bridge element 426 may further store the MAC address within the forwarding cache 474. In another example, the bridge element 426 may identify a MAC address that is infrequently used. This infrequently used MAC address may be removed from the forwarding cache 474 to make storage room available for other MAC addresses. The bridge element 426 may send an update message to the controlling bridge 448 to have the MAC address removed from the global forwarding table 411.

Address data stored within the global forwarding table 411 may be communicated to one or more forwarding caches 474, 476, 478, and 480 of the distributed virtual bridge 408. For example, the bridge element 426 may receive a data frame that includes a destination MAC address that is not stored within the forwarding cache 474. To obtain information for forwarding the data frame, the bridge element 426 may send a query to a bridge element 439 configured to access the controlling bridge 448. The bridge element 439 may search the global forwarding table 411 for address data associated with the destination MAC address. If the address data is found, the bridge element 439 may forward the MAC address through the distributed virtual bridge 408 to the querying bridge element 426. The bridge element 426 may store the MAC address as address data within the forwarding cache 474. As with the global forwarding table 411, the address data included within the forwarding caches 474, 476, 478, and 480 of the distributed virtual bridge 408 may include both internal address information, as well as addresses that are external to the system 400.

Each of the bridge elements 426, 428, 430, and 432 may be connected to one or more transport layer modules 482, 484, 486, and 488. The transport layer modules 482, 484, 486, and 488 may include buffering used for attachment to the integrated switch router 442. The transport layer modules 482, 484, 486, and 488 may further provide a frame-based, Ethernet-like interface to the integrated switch router 442.

The transport layer modules 482, 484, 486, and 488 may each include a shared buffer used to transmit frames across the integrated switch router 442. Additional buffers of the transport layer modules 482, 484, 486, and 488 may be used to receive data frames from the integrated switch router 442. The buffers may be divided into different virtual lanes. Virtual lanes may include logically separated paths for data frame traffic flowing between a bridge element and a transport layer module. For example, there may be four virtual lanes between the bridge element 426 and the transport layer module 482. The virtual lanes may correspond to differently prioritized traffic. The transport layer modules 482, 484, 486, and 488 may include logic to recover from faulty microchips and links between a source and a destination. The transport layer modules 482, 484, 486, and 488 may maintain a strict ordering of packets within a particular virtual lane regardless of each data frame's path through the local rack interconnect network 490 and the computer system 400.

The integrated switch router 442 may communicate with the transport layer modules 482, 484, 486, and 488 and may facilitate routing and packet delivery to and from the local rack interconnect network 490. The local rack interconnect network 490 may include links to the bridge elements 426, 428, 430, and 432 located within the same chassis and rack, as well as links to the bridge elements 434-440 in different chassis and racks. The local rack interconnect network 490 may include point-to-point connections, or pipes, between the bridge elements 426, 428, 430, 432, and 433-440 of the distributed virtual bridge 408 with no frame loss and with in-order frame delivery.

The second server computer 404 may include a server computer similar to the first server computer 402 and may be similar to the server computer 206 of FIG. 2. As such, the second server computer 404 may be located within a different chassis and rack than the first server computer 402. The first server computer 402, the second server computer 404 may include a processor 499 coupled to a memory 497 and to an operating system 495. The second server computer 404 may further include virtual machines 455, 457, 459, 461, 463, and 465.

A hypervisor 467 may be coupled to the virtual machines 457, 459. The hypervisor 467 may include a hypervisor virtual bridge 471 that allows direct communication between the virtual machines 457, 459. A hypervisor virtual bridge 473 of a hypervisor 469 coupled to the virtual machines 461, 463 may facilitate direct communication between the virtual machines 461, 463. For example, the hypervisor virtual bridges 471, 473 may register address data with the controlling bridge 448.

The second server computer 404 may also include one or more adapters 418, 420, 422, and 424, such as converged CEE network adapters. Each adapter 418, 420, 422, and 424 may be coupled to one or more of the virtual machines 455, 457, 459, 461, 463, and 465. The adapters 418, 420, 422, and 424 may each include a converged adapter virtual bridge 475, 477, 479, and 481. The converged adapter virtual bridges 475, 477, 479, and 481 may facilitate sharing of the adapters 418, 420, 422, and 424 by coordinating virtual machine access. The adapters 418, 420, 422, and 424 may each couple to one or more of the bridge elements 434, 436, 438, and 440 of the distributed virtual bridge 408. Each adapter 418, 420, 422, and 424 may include one or more CEE transmit ports that couple to one of the bridge elements 434, 436, 438, or 440.

Each bridge element 434, 436, 438, and 440 may include a forwarding cache 483, 485, 487, and 489 that includes address data used to forward data frames that are received by the bridge elements 434, 436, 438, and 440. The bridge elements 434, 436, 438, and 440 may each be connected to one or more transport layer modules 415, 417, 419, and 421. The transport layer modules 415, 417, 419, and 421 may include buffering used for the attachment to the integrated switch router 446. The transport layer modules 415, 417, 419, and 421 may further provide a frame-based, Ethernet-like interface to the integrated switch router 446 and may maintain packet ordering. A portion of the distributed virtual bridge 408 shown in FIG. 4 as located above the local rack interconnect network 490 and as associated with the server computers 402, 404 may be referred to as a north portion. The north bridge elements 426, 428, 430, 432, 434, 436, 438, and 440 may be coupled to the adapters 410, 412, 414, 416, 418, 420, 422, and 424.

The I/O blade device 406 may be the I/O server computer 258 of FIG. 2. As such, the I/O blade device 406 may allow uplink connectivity to an external Ethernet network 492 via an integrated switch router 401 that is coupled to transport layer modules 423, 425, 427, 429, and 431.

The transport layer modules 423, 425, 427, 429, and 431 may each couple to a bridge element 433, 435, 437, and 439. The bridge elements 433, 435, 437, and 439 may each include a forwarding cache 441, 443, 445, and 447. The I/O blade device 406 may be categorized as being included within a south portion of the distributed virtual bridge 408 because the bridge elements 433, 435, 437, and 439 may be coupled to an uplink to the Ethernet network 492.

The I/O blade device 406 may include a memory 409, an operating system 491, and a processor 453 that includes the controlling bridge 448. The bridge element 439 may be coupled to the processor 453 via an Ethernet link connection. The transport layer module 431 may be coupled to a PCIe bus 444 that is coupled via a PCIe link connection to the processor 453 and the controlling bridge 448. The PCIe bus 444 may also be coupled to a PCIe slot 493. The processor 453 may further include a Peripheral Component Interconnect Manager (PCIM) 451.

The controlling bridge 448 may communicate with the bridge elements 426, 428, 430, and 432-440 and other controlling bridges (not shown) of the computer system 400. The controlling bridge 448 may include firmware executing on the processor 453 that manages the bridge elements 426, 428, 430, and 432-440. For example, the controlling bridge 448 may be configured to divide a workload between the bridge elements 426, 428, 430, and 432-440, as well as perform synchronization procedures and failover operations.

The controlling bridge 448 may be configured to interface with and program the bridge elements 426, 428, 430, 432-440 and the adapters 466, 468, 470, 472, 475, 477, 479, 481. More particularly, the controlling bridge 448 may be configured to generate and send a management frame to one or more of the bridge elements 426, 428, 430, 432-440 and the adapters 466, 468, 470, 472, 475, 477, 479, 481. The management frames may include instructions used to program operating parameters of the bridge elements 426, 428, 430, 432-440 and the adapters 466, 468, 470, 472, 475, 477, 479, 481 and other switches.

The controlling bridge 448 may include the Fiber Channel Forwarder 413. FCoE may offer the capability to transport fiber channel payloads on top of an Ethernet network. The Fiber Channel Forwarder 413 may execute the Fiber Channel Initialization Protocol to discover and initialize FCoE capable entities connected to an Ethernet cloud. The Fiber Channel Forwarder 413 may further include firmware that encapsulates and de-encapsulates Fiber Channel data frames (e.g., FCoE formatted data frames). In at least one embodiment, the Fiber Channel Forwarder 413 may translate between Ethernet and Fiber Channel protocols.

The controlling bridge 448 may additionally include the global forwarding table 411. The global forwarding table 411 may include address data (e.g., MAC addresses) that is registered and maintained through communication and cooperation with the bridge elements 426, 428, 430, and 432-440, and in some cases, the hypervisors 462, 467, and 469.

In one example, the global forwarding table 411 may maintain MAC addresses that have been learned by a bridge element 426. The bridge element 426 may register the address data with the controlling bridge 448. The controlling bridge 448 may update the global forwarding table 411 by adding the address data to the global forwarding table 411. Similarly, the bridge element 426 may cause the controlling bridge 448 to update the global forwarding table 411 by sending an update message to the controlling bridge 448. The update message may cause the controlling bridge 448 to delete a MAC address that has been aged out by the bridge element 426. A MAC address may further be deleted when the bridge element 426 has detected that the address data is no longer valid.

In another example, the hypervisor virtual bridge 464 may register MAC addresses or other address data with the controlling bridge 448. The global forwarding table 411 may include address data associated with addresses that are included within the system 400, as well as addresses that are external to the system 400.

Figure 5:
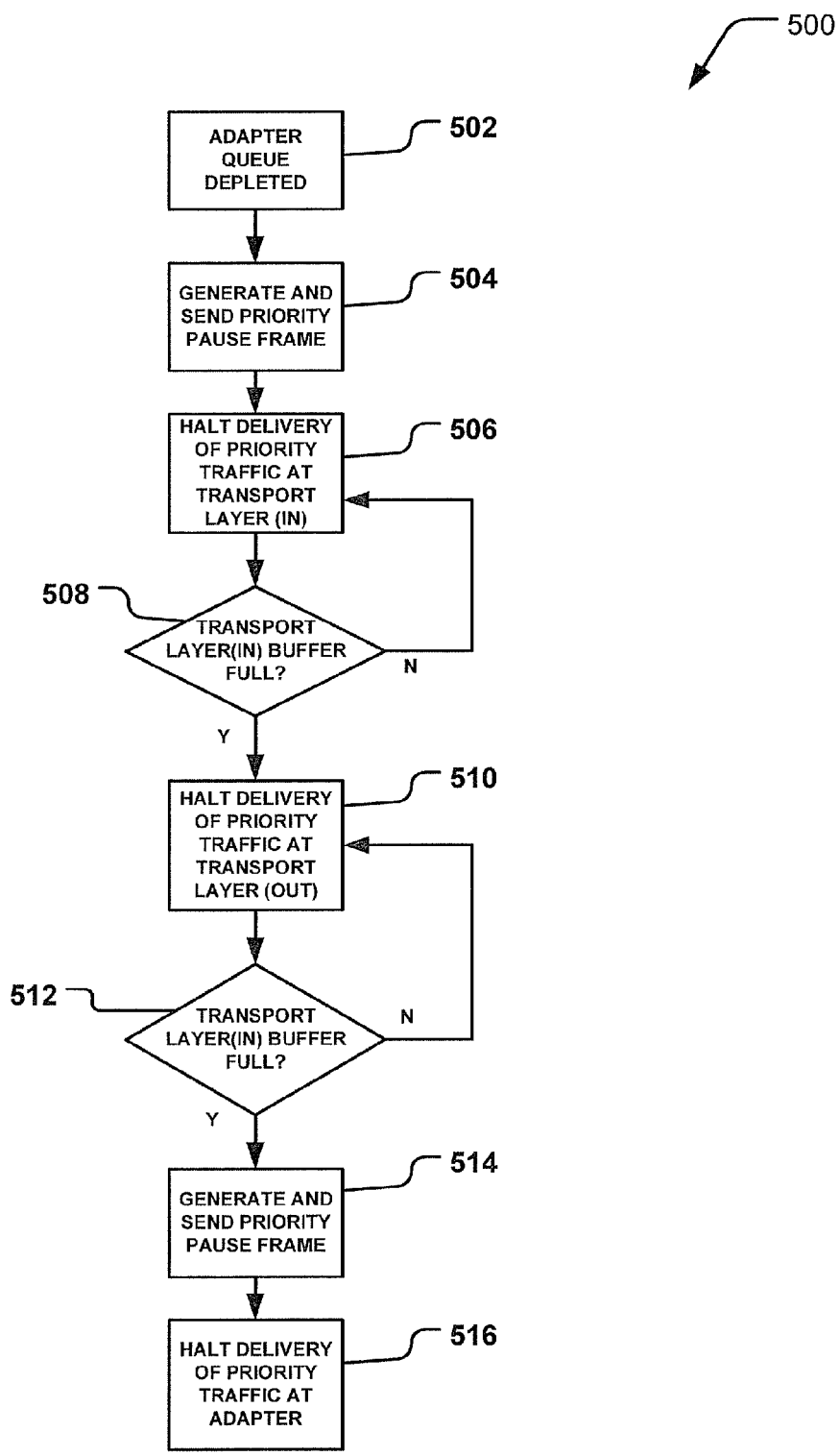
FIG. 5 is a flow diagram of a particular embodiment of a method of managing data frame traffic flow using a distributed virtual bridge.

FIG. 5 is a flow diagram of an embodiment of a method 500 configured to manage the flow of prioritized data frames according to their priority and based on a buffer threshold capacity. An embodiment of the method 500 may be executed by a distributed virtual bridge, such as the distributed virtual bridge 310 of FIG. 3.

At 502, an adapter receive queue may become depleted. The adapter queue may store data frames having an assigned priority. For example, the queue 335 of the adapter 306 of FIG. 3 may become depleted. The queue 335 may include data frames associated with a second of four priorities mapped by a bridge element.

A priority pause frame may be generated and transmitted, at 504. For instance, the adapter 306 of FIG. 3 may generate and send a pause control frame to the bridge element 328. At 506, delivery of traffic associated with the priority may be halted at the transport layer module "in." For example, the bridge element 328 of FIG. 3 may communicate with the transport layer module 327 to prevent the buffer 330 from sending data frames associated with the second priority. The transport layer module may continue to receive data frames associated with the priority until the buffer is full, at 508.

At 510, delivery of the traffic with the designated priority may be halted at the transport layer module "out." For example, the transport layer module 316 of FIG. 3 may stop sending data frames associated with the second priority. A communication to halt delivery of the priority traffic may be transmitted throughout the distributed virtual bridge using a credit exchange or other system.

The buffer associated with the second priority may continue to fill with prioritized traffic, at 512. When the buffer is full, a pause control frame may be generated and sent to an adapter, at 514. For instance, the bridge element 314 of FIG. 3 may forward a pause control frame to the adapter 302. Delivery of the priority traffic at the adapter may be halted, at 516. For example, in response to the priority pause frame, the adapter 302 of FIG. 3 may cease sending data frames associated with the second priority from the queue 319.

FIG. 5 thus shows a method of managing the flow of data frame traffic using a distributed virtual bridge. Data frame transmission may be paused based on the priority of the data frames and a predetermined threshold capacity of network devices. Aspects may improve flow control while maintaining frame integrity.

Particular embodiments can take the form of an entirely hardware embodiment, an entirely software embodiment, or an embodiment containing both hardware and software elements. Further, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, or communicate the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Examples of optical disks include compact disc—read only memory (CD-ROM), compact disc—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

While the present invention has been illustrated by a description of various embodiments and while these embodiments have been described in considerable detail, it is not the intention of the Applicants to restrict, or any way limit the scope of the appended claims to such detail. For example, where loss is tolerated, a transport layer module may be configured to discard data frames when a buffer is full. According to another embodiment, the (sending) transport layer module may implement virtual output queuing by supporting one connection per target port/priority. This feature may minimize head of line block conditions. If a chip is temporarily blocked, only a virtual output queuing targeting (e.g., chip identifier and priority) may be blocked, allowing traffic to continue to flow. In the case of a lossy virtual lane, a threshold may be set on the virtual output queuing targeting so that only packets targeting the busy direction may be discarded. An embodiment in its broader aspects is therefore not limited to the specific details, representative apparatus, methods, and illustrative examples shown and described. Accordingly, departures may be made from such details without departing from the scope of Applicants' general inventive concept.

The invention claimed is:

1. An apparatus, comprising:
a first adapter comprising a first queue that corresponds to a first priority and a second queue that corresponds to a second priority, wherein the first queue is configured to store a first data frame associated with the first priority, wherein the second queue is configured to store a second data frame associated with the second priority, and wherein the first adapter is configured to generate a first priority pause frame; and
a distributed virtual bridge coupled to the first adapter, the distributed virtual bridge comprising:
an integrated switch router;
a first transport layer module configured to:
provide a frame-based interface to the integrated switch router;
receive the first data frame from a second transport layer module via the integrated switch router; and
receive the second data frame from the second transport layer module via the integrated switch router, wherein the first transport layer module includes a first buffer associated with the first priority and a second buffer associated with the second priority; and
a first bridge element coupled to the first adapter and to the first transport layer module, wherein the first bridge element is configured to:
receive the first priority pause frame from the first adapter, wherein receipt of the first priority pause frame initiates generation of a first interrupt signal;
communicate the first interrupt signal to the first transport layer module to interrupt delivery of the first data frame to the first queue
wherein while the delivery of the first data frame is interrupted, the second data frame associated with the second priority is received from the first transport layer module and the second data frame is forwarded from the first transport layer module to the second queue.

2. The apparatus of claim 1, wherein the first priority pause frame is communicated to the first bridge element in response to the first queue reaching a particular threshold capacity.

3. The apparatus of claim 1, wherein transmission of the second data frame is unaffected by the first priority pause frame.

4. The apparatus of claim 1, wherein the second transport layer module includes a third buffer configured to store data frames associated with the first priority.

5. The apparatus of claim 4, wherein the first transport layer module communicates with the second transport layer module regarding a status of the first buffer of the first transport layer module using a credit exchange system.

6. The apparatus of claim 4, wherein the distributed virtual bridge further comprises a second bridge element coupled to the second transport layer module.

7. The apparatus of claim 6, wherein the second bridge element is configured to generate a second priority pause frame to interrupt delivery of the data frames associated with the first priority to the second buffer.

8. The apparatus of claim 7, wherein the second bridge element is configured to communicate the second priority pause frame to a second adapter coupled to the second bridge element, wherein the second adapter is configured to transmit the data frames associated with the first priority.

9. The apparatus of claim 1, wherein the first adapter includes a plurality of queues associated with a plurality of priorities.

10. The apparatus of claim 1, wherein the distributed virtual bridge further comprises a controlling bridge coupled to the first bridge element, the controlling bridge configured to program the first bridge element.

11. The apparatus of claim 1, wherein the first bridge element is configured to identify the first priority associated with the first data frame.

12. A method of managing data frame traffic flow, the method comprising:
   receiving at a node of a distributed virtual bridge, the node comprising a bridge element and a first transport layer module, a first priority pause frame from a first adapter, wherein the first priority pause frame is generated by the first adapter in response to detecting a status of a first queue of the first adapter, the first queue configured to store a first data frame associated with a first priority, wherein receipt of the first priority pause frame from the first adapter initiates generation of a first interrupt signal at the bridge element;
   receiving the first data frame at the first transport layer module from a second transport layer module via an integrated switch router;
   communicating a first interrupt signal from the bridge element to the first transport layer module to interrupt delivery of the first data frame to the first queue;
   receiving, while delivery of the first data frame is interrupted, a second data frame associated with a second priority at the first transport layer module from the second transport layer module via the integrated switch router;
   forwarding the second data frame from the first transport layer to the first adapter; and
   wherein the distributed virtual bridge is coupled to the first adapter, the distributed virtual bridge comprises the integrated switch router and the second transport layer module, wherein the bridge element is coupled to the first adapter and to the first transport layer module, and wherein the first transport layer module includes a first buffer associated with the first priority.

13. The method of claim 12, wherein the first transport layer module is configured to provide a frame-based interface to the integrated switch router.

14. The method of claim 12, further comprising determining from the first priority pause frame that the first queue has reached a particular threshold capacity.

15. The method of claim 12, further comprising using a credit exchange system to communicate a status of the first buffer of the first transport layer module to the second transport layer module.

16. The method of claim 15, further comprising interrupting a delivery of a third data frame associated with the first priority from the second transport layer module.

17. The method of claim 16, further comprising generating a second priority pause frame at a bridge element coupled to the second transport layer module.

18. A program product, comprising:
   program code executable at a node of a distributed virtual bridge, the node comprising a bridge element and a first transport layer module:
      to receive a priority pause frame from an adapter, wherein the priority pause frame is generated by the adapter in response to detecting a status of a queue configured to store a first data frame associated with a first priority, wherein receipt of the priority pause frame from the adapter initiates generation of an interrupt signal at the bridge element;
      to communicate the interrupt signal to the first transport layer module, wherein the interrupt signal is configured to interrupt delivery of the first data frame to the queue;
      to receive the first data frame at the first transport layer module from a second transport layer module via an integrated switch router;
      to receive, while delivery of the first data frame is interrupted, a second data frame associated with a second priority at the first transport layer module from the second transport layer module via the integrated switch router; and
      to forward the second data frame to the adapter, wherein the distributed virtual bridge is coupled to the adapter, the distributed virtual bridge comprises the integrated switch router and the second transport layer module, wherein the bridge element is coupled to the adapter and to the first transport layer module, and wherein the first transport layer module includes a buffer associated with the first priority; and
   a computer readable storage device bearing the program code.

19. The method of claim 15, wherein the distributed virtual bridge further comprises the second transport layer module coupled to the integrated switch router, and wherein the second transport layer module includes a second buffer configured to store the data frames associated with the first priority.

* * * * *